March 22, 1927.

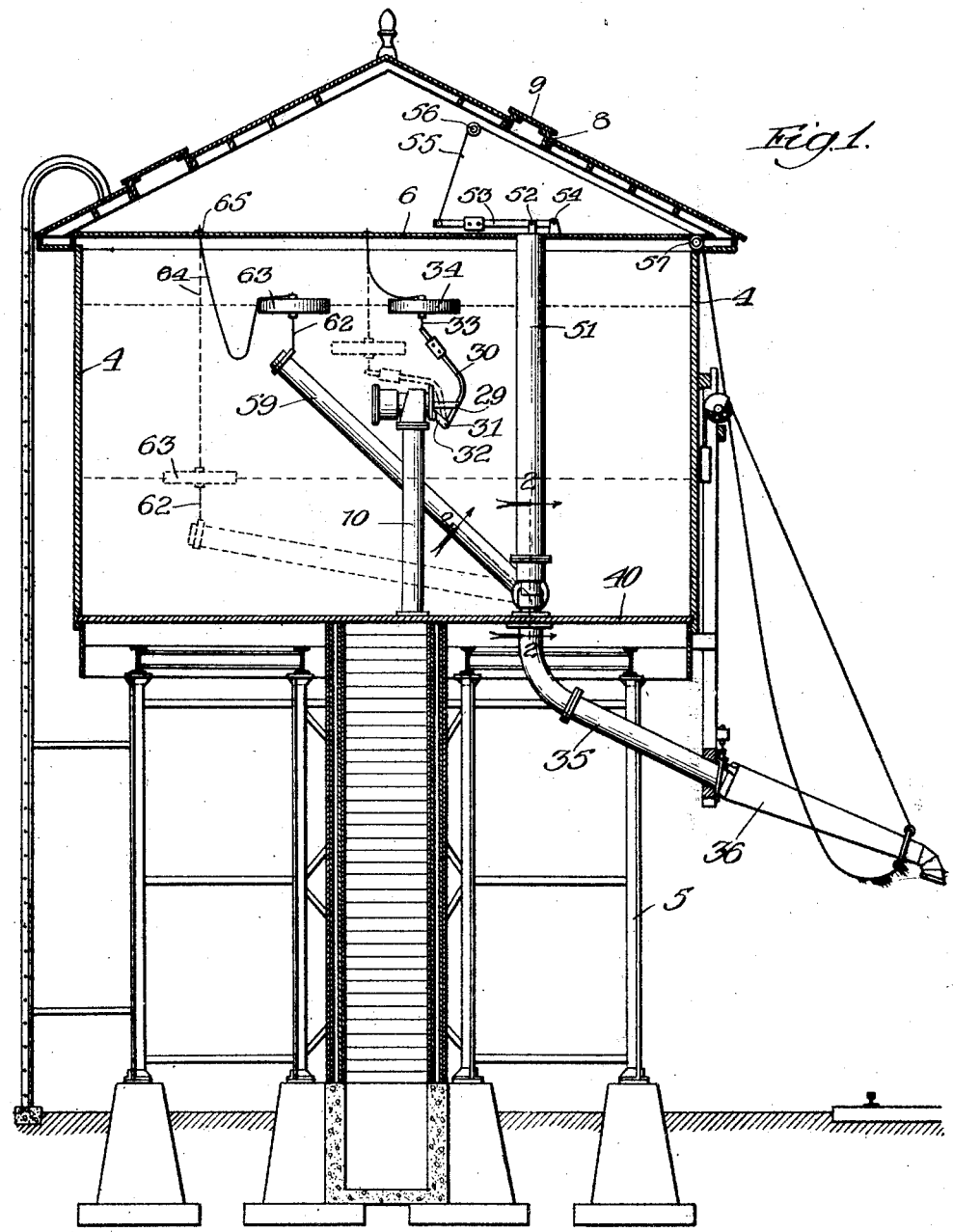

B. S. SNOW 1,621,959

STORAGE TANK

Filed Nov. 19, 1925  2 Sheets-Sheet 2

Inventor:
Barton S. Snow
By Dyrenforth, Lee, Chritton & Wiles
Attys

Patented Mar. 22, 1927.

1,621,959

UNITED STATES PATENT OFFICE.

BARTON S. SNOW, OF BATAVIA, ILLINOIS, ASSIGNOR TO T. W. SNOW CONSTRUCTION CO., OF CHICAGO, ILLINOIS, A CORPORATION OF ILLINOIS.

STORAGE TANK.

Application filed November 19, 1925. Serial No. 70,033.

My invention, as to one feature thereof, relates generally to tanks for storing water, as for example, for use in the charging of tenders of locomotives; and as to another feature thereof, more particularly to tanks for storing chemically treated water, or muddy water, as for example for the use above stated.

One of my objects is to provide a float-controlled inlet valve for the tank which shall avoid objectionable slow closing thereof in its final closing movement and consequent "wire cutting", of its seat, and overflow of water from the tank producing waste of water and undesirable conditions about the tank.

Another object is to provide for the ready removal, for substitution or repair, of the valve controlling the outlet of the tank, with the minimum waste of water, and inconvenience and danger to the workmen, and to accomplish this by simple and economical means; and other objects as will be manifest from the following description.

Referring to the accompanying drawings:—

Figure 2:
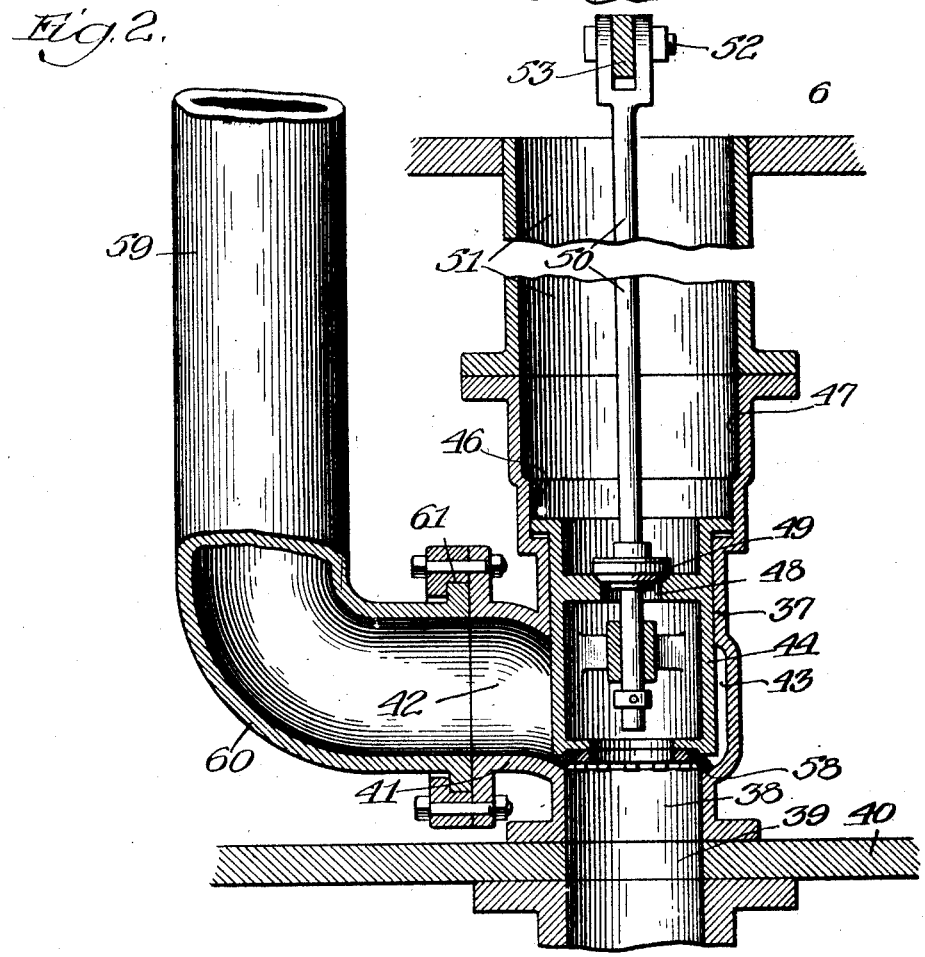

Figure 1 is a view in vertical sectional elevation of water storage apparatus embodying my improvements. Figure 2 is an enlarged broken sectional view taken at the lines 2—2 in Fig. 1 and viewed in the direction of the arrows; and Figure 3, a broken enlarged view in longitudinal sectional elevation of the float-controlled inlet valve for the tank.

The particular illustrated apparatus comprises a main tank portion 4 shown as supported upon a framework 5. The tank is closed at its upper end, except for the openings hereinafter referred to, by the cover portion 6 which extends below, and is spaced from, a roof portion 7 containing a manhole controlled by a cover 9, all in accordance with common practice.

Extending upwardly into the tank 4 is an inlet water pipe 10 which would communicate with the source of water to be supplied to the tank, the upper end of this pipe being provided with float-controlled valve mechanism operating automatically to open the inlet pipe to the tank when the water level drops below a predetermined line, and replenish the water in the tank up to this level, a description of the particular illustrated means provided for this purpose being as follows.

Mounted on the upper end of the pipe 10 and opening into the latter is a valve casing 11 provided, adjacent its outlet 12, with an annular valve seat 13 with which an annular gasket 14 of flexible material carried on the end of a valve proper 15 slidable in the casing 11, cooperates to control the flow of water from the pipe 10 into the tank. At the rear of the valve seat 13 the casing 11 is cored out to provide an annular channel 16 communicating with the upper end of the pipe 10, the rear end of the casing 11 being of different enlarged internal diameters as represented at 17 and 18, its rear extremity being closed by a cover plate 19.

The valve proper 15, which is a piston valve, contains an opening 20 in its forward end, whereby the interior of the valve 15 is in communication at all times with the outlet 12, and is provided at its opposite end with a partition 21 containing an opening 22 therethrough, preferably annularly tapered as represented at 23, and forming a communication between the interior of the piston valve and the rear end of the casing 11, this valve being provided with an annular, outwardly projecting, flange, 24 which extends into the rear portion of the casing of larger diameter as stated. The internal diameter of the portion 17 of the casing is slightly larger than the external diameter of the flange portion 24 of the valve 15 to provide a slight space between this flange and the wall of the portion 17 of the casing, the flange 24 extending into the portion 17 when the valve 15 is in closed condition.

An auxiliary valve is provided for controlling the opening 22, this valve comprising a valve proper 25 adapted when in closed position to engage the seat 23 and close communication between the interior of the piston valve 15 and the compartment at the rear of the casing 11. This auxiliary valve also comprises a valve stem 26 to one end of which the valve 25 is connected, and a disk 27 carried by the stem 26 and spaced from the valve 25, the stem 26 sliding in a bearing 28 located in, and rigid with, the piston 15 in front of, and spaced from, the partition 21. The outer end of the valve stem 26 is pivotally connected at 29 with a lever 30 pivoted at its lower end as indicated at 31 on a bracket 32 secured to the valve casing 11, the upper end of the lever 30 being flexibly connected, as for example by a cable 33 with a float 34 which floats upon the water in the tank 4.

Figure 3:
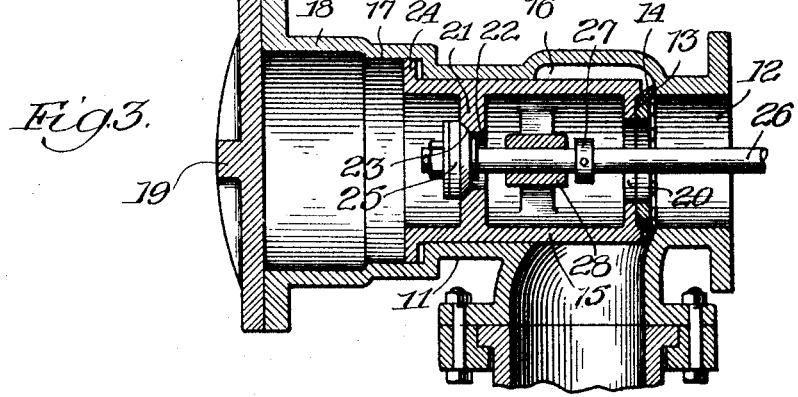

The operation of the inlet-controlling mechanism just described is as follows: Assuming the parts of the apparatus to be in the full line position represented in Fig. 1 and in the position shown in Fig. 3, wherein the inlet pipe 10 is closed to the tank, the drawing of water from the tank causes the float 34 to lower thereby permitting the lever 30 to rock toward the dotted position shown in Fig. 1. Movement of the lever 30 as stated shifts the valve stem 26 to the left in Figs. 1 and 3, the initial movement of this stem moving the valve 25 away from the seat 23 and thereby permitting the water in the rear end of the casing, and under pressure, to flow through the opening 22, thereby relieving the pressure at the rear side of the valve 15. Continued movement of the stem 26 to the left, causes the disk 27 to engage the bearing 28 and thereby bodily shift the valve 15 to the left in these figures to open position in which the water flows from the pipe 10 into the tank. As the water rises in the tank it carries the float 34 upwardly therewith and swings the lever 30 toward full line position represented in Fig. 1, the initial movement of this lever closing the valve 25 against the seat 23, whereupon the valve 15 is bodily moved by the stem 26 to the right in these figures. As the valve 15 nears closed position, water from the inlet pipe 10 flowing between the valve 15 and the casing 11 and into the rear end of the latter, the valve 15 loosely fitting in the casing builds up a back pressure therein, this pressure, by reason of the fact that the area exposed by the end of the piston valve 15 and exposed to the liquid in the rear compartment of the casing 11 and tending to force this valve to the right in Fig. 3, is greater than the area of the piston exposed in this compartment to the liquid therein tending to force it to the left in this figure, operating to force the valve 15, relatively quickly, to its seat, thereby avoiding the subjection of the valve seat and gasket 14 to water flowing therethrough at great velocity with consequent elimination of "wire-cutting" of these parts. In this connection it may be stated that were the valve controlling the inlet pipe 10, moved to final closed position under the action of the float, the valve seat and gasket cooperating therewith, would be subjected to water flowing therethrough with great velocity over a relatively long period of time, due to the fact that the more nearly the controlling valve is in closed position, the slower the upward movement of the float.

By applicant's arrangement the valve may be caused to be moved by the float to a point where "wire-cutting" could not result, and the final closing movement of the valve from this point be effected relatively quickly and by the action of the pressure of water delivered by the pipe 10.

The tank 4 is provided with means for controlling the discharge of water from the tank through a pipe 35 shown as provided at its discharge end with a movable spout section 36, these means, according to the preferred illustrated embodiment of my invention, comprising a valve device of the same general construction, and operating on the same general principle, as the valve above described and controlling the inlet of water into the tank through the pipe 10. This valve mechanism comprises a valve casing or body 37 shown as located in the tank 4 and supported to extend upwardly, with its outlet 38 registering with an opening 39 in the bottom 40 of the tank and opening into the upper end of the pipe 35. The valve casing 37 is provided with a laterally extending portion 41 containing the inlet 42 of the valve which opens into the valve body 37 at its annularly channeled portion 43. The valve proper, which loosely fits in the casing 37, is represented at 44, its annularly flanged portion 45 operating in the chambered portion of this casing above the valve 44 and of successively larger internal diameters as represented at 46 and 47. The auxiliary valve structure controlling the opening 48 in the valve 44, is represented at 49, the stem of this valve being represented at 50. The valve body 37 is provided with an upwardly projecting tubular extension 51 shown as of substantially the same internal diameter throughout its height as the chambered portion 47 of the valve body, this extension reaching upwardly beyond the normal water level in the tank, and preferably to the height shown where it opens upwardly through the cover portion 6.

The moving parts of the valve structure described thus operate in a substantially vertical direction, the stem 50 of the auxiliary valve 49, and through the medium of which the piston valve 44 is raised and lowered, being pivotally connected at 52 with a weighted lever 53 pivoted at 54 on the cover portion 6, the outer end of this lever being connected with a cable 55 running over pulleys 56 and 57 with its outer end accessible to the operator for upwardly actuating the lever 53 and valve stem 50 when it is desired that water be drawn from the tank, it being understood, from the above description of the valve for the inlet pipe 10, that under the downward pressure exerted on the stem 50 by the weighted lever 53, the auxiliary valve 49 will close and thereupon force the main valve 44 down, the pressure of the water above the main valve 44, and supplied from the inlet 42 through the clearance between the valve 44 and casing 37, operating to cause this valve to be tightly forced against the seat 58 with which it cooperates, thereby ensuring a tight joint. Owing to the relatively large diameter of the portion 47 of the valve body, the valve 44 may move downwardly under the action of the weighted lever 53, relatively fast, the final movement of the valve to closed position, being retarded sufficiently to prevent water hammering, by the requirement that the water beneath the flange 45 be displaced upwardly through the relatively slight clearance between this flange and the wall of the portion 46 of the valve body. The flow of the water from the tank 4 to the discharge pipe 35 is through a pipe 59 located in the tank, with its lower, or elbow, end 60 swiveled, as represented at 61, to the outer end of the portion 41 of the valve body 37, the outer end of the pipe 60 which is open, being attached, by the connector 62, with a float 63 located within the tank 4 and adapted to float upon the water therein and maintain the upper, inlet, end of the pipe 59 submerged in the water in the tank at a slight distance below the top of the water. The float 63 is shown as connected with a cable 64 which extends through an opening in the cover portion 6 and provided with a button 65 located above this cover section, the length of this cable being such that the pipe 59 may not lower at its inlet below a predetermined point, as for example as shown by dotted lines in Fig. 1.

It will be noted from the foregoing that the water supplied to the pipe 35 is taken from the body of water in the tank 4 between the upper and lower zones thereof, thereby ensuring the supplying of clear water to this pipe, the withdrawal of the water from the tank at an intermediate zone as stated, avoiding the draining into the pipe 35 not only of the sludge which may be in the bottom of the tank, but also such scum and other light particles as may float on the surface of the water.

It will be understood from the foregoing that when it is desired to remove the valve controlling the outlet of the tank 4, either for purposes of repair or replacement, it is not necessary that the operator enter the tank structure, as the operating parts of the valve may be readily bodily lifted out of the tank through the open upper end of the "valve body extension", it being understood that prior to the removal of the valve the operator swings the pipe 59 to a position in which its open upper end is above the water line, maintaining this pipe in such position until the valve is again repositioned for use.

It will also be noted that by providing a valve structure of the character stated, the amount of water which is wasted in the operation of removing the valve controlling the outlet from the tank, is reduced to the minimum, as the only water wasted is that which is located in portions of the apparatus of relatively small cross-sectional area.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. Water-storage apparatus, comprising a tank, a valve controlling the flow of water therefrom and comprising a valve body in said tank containing an inlet and an outlet and a valve proper controlling the flow of water through said valve body, and means controlling the flow of water into said inlet, said valve body having an upwardly projecting extension and said valve proper being bodily liftable out of said body and extension, said extension projecting close to the top of the tank to prevent draining of the latter through the upper end of said extension when said valve proper is removed.

2. Water-storage apparatus, comprising a tank, a valve controlling the flow of water therefrom and comprising a valve body in said tank containing an inlet and an outlet and a valve proper controlling the flow of water through said valve body, and constructed and arranged to be forced to close position by water pressure accumulating above said valve proper, and means controlling the flow of water into said inlet, said valve body having an upwardly projecting extension and said valve proper being bodily liftable out of said body and extension, said extension projecting close to the top of the tank to prevent draining of the latter though the upper end of said extension when said valve proper is removed.

3. Water-storage apparatus, comprising a tank, a valve controlling the flow of water therefrom and comprising a valve body in said tank containing an inlet and an outlet having a seat and a valve proper controlling the flow of water through said valve body, with valve packing carried by said valve proper and adapted to engage said seat, and means controlling the flow of water into said inlet, said valve body having an upwardly projecting extension and said valve proper being bodily liftable out of said body and extension, said extension projecting close to the top of the tank to prevent draining of the latter through the upper end of said extension when said valve proper is removed.

4. Water-storage apparatus, comprising a tank, a valve controlling the flow of water therefrom and comprising a valve body in said tank containing an inlet and an outlet and a valve proper controlling the flow of water through said valve body, and a pipe swiveled on said valve body to be movable at this inlet end up and down in said tank and communicating at its outlet with the inlet of said valve body, said valve body having an upwardly projecting extension and said valve proper being bodily liftable out of said body and extension, said extension projecting close to the top of the tank, to prevent draining of the latter through the upper end of said extension when said valve proper is removed.

BARTON S. SNOW.